(12) United States Patent
Carter et al.

(10) Patent No.: US 9,742,864 B2
(45) Date of Patent: Aug. 22, 2017

(54) SYSTEM AND METHOD FOR IMPLEMENTING CLOUD MITIGATION AND OPERATIONS CONTROLLERS

(75) Inventors: Stephen R. Carter, Spanish Fork, UT (US); Lloyd Leon Burch, Payson, UT (US); Carolyn Bennion McClain, Springville, UT (US); Dale Robert Olds, Draper, UT (US)

(73) Assignee: Novell, Inc., Provo, UT (US)

( * ) Notice: Subject to any disclaimer, the term of this patent is extended or adjusted under 35 U.S.C. 154(b) by 1419 days.

(21) Appl. No.: 12/612,903

(22) Filed: Nov. 5, 2009

(65) Prior Publication Data

US 2011/0106927 A1 May 5, 2011

(51) Int. Cl.
G06F 15/173 (2006.01)
H04L 29/08 (2006.01)
G06F 21/55 (2013.01)

(52) U.S. Cl.
CPC .......... H04L 67/306 (2013.01); G06F 21/554 (2013.01); H04L 67/10 (2013.01)

(58) Field of Classification Search
CPC ...... H04L 67/306; H04L 67/10; G06F 21/554
USPC ....................................................... 709/223
See application file for complete search history.

(56) References Cited

U.S. PATENT DOCUMENTS

| | | |
|---|---|---|
| 5,428,738 A | 6/1995 | Carter et al. |
| 5,608,903 A | 3/1997 | Prasad et al. |
| 5,677,851 A | 10/1997 | Kingdon et al. |
| 5,758,344 A | 5/1998 | Prasad et al. |
| 5,784,560 A | 7/1998 | Kingdon et al. |
| 5,787,175 A | 7/1998 | Carter |
| 5,832,275 A | 11/1998 | Olds |
| 5,832,487 A | 11/1998 | Olds et al. |
| 5,870,564 A | 2/1999 | Jensen et al. |
| 5,878,415 A | 3/1999 | Olds |
| 5,878,419 A | 3/1999 | Carter |
| 5,956,718 A | 9/1999 | Prasad et al. |
| 6,067,572 A | 5/2000 | Jensen et al. |
| 6,108,619 A | 8/2000 | Carter et al. |
| 6,119,230 A | 9/2000 | Carter |
| 6,185,612 B1 | 2/2001 | Jensen et al. |
| 6,219,652 B1 | 4/2001 | Carter et al. |
| 6,275,819 B1 | 8/2001 | Carter |
| 6,405,199 B1 | 6/2002 | Carter et al. |
| 6,459,809 B1 | 10/2002 | Jensen et al. |
| 6,519,610 B1 | 2/2003 | Ireland et al. |
| 6,539,381 B1 | 3/2003 | Prasad et al. |
| 6,601,171 B1 | 7/2003 | Carter et al. |

(Continued)

*Primary Examiner* — Joseph Greene
(74) *Attorney, Agent, or Firm* — Haynes and Boone LLP

(57) ABSTRACT

System and method for implementing cloud mitigation and operations controllers are described. One embodiment is a system for controlling operation of a cloud computing environment, wherein the system comprises a repository for storing data regarding characteristics of the cloud computing environment, wherein the stored data includes policy notations designating compliance or noncompliance of the data with policy; an analyst module for analyzing the stored data in combination with external report information regarding the cloud computing environment and for providing results of the analysis; and a controller for evaluating the analysis results and issuing instructions for controlling operation of the cloud computing environment based on the evaluating.

20 Claims, 2 Drawing Sheets

(56) References Cited

U.S. PATENT DOCUMENTS

| | | |
|---|---|---|
| 6,647,408 B1 | 11/2003 | Ricart et al. |
| 6,650,777 B1 | 11/2003 | Jensen et al. |
| 6,697,497 B1 | 2/2004 | Jensen et al. |
| 6,738,907 B1 | 5/2004 | Carter |
| 6,742,035 B1 | 5/2004 | Zayas et al. |
| 6,742,114 B1 | 5/2004 | Carter et al. |
| 6,760,843 B1 | 7/2004 | Carter |
| 6,772,214 B1 | 8/2004 | McClain et al. |
| 6,826,557 B1 | 11/2004 | Carter et al. |
| 6,862,606 B1 | 3/2005 | Major et al. |
| 6,993,508 B1 | 1/2006 | Major et al. |
| 7,043,555 B1 | 5/2006 | McClain et al. |
| 7,107,538 B1 | 9/2006 | Hinckley et al. |
| 7,152,031 B1 | 12/2006 | Jensen et al. |
| 7,177,922 B1 | 2/2007 | Carter et al. |
| 7,185,047 B1 | 2/2007 | Bate et al. |
| 7,197,451 B1 | 3/2007 | Carter et al. |
| 7,286,977 B1 | 10/2007 | Carter et al. |
| 7,299,493 B1 | 11/2007 | Burch et al. |
| 7,316,027 B2 | 1/2008 | Burch et al. |
| 7,334,257 B1 | 2/2008 | Ebrahimi et al. |
| 7,356,819 B1 | 4/2008 | Ricart et al. |
| 7,363,577 B2 | 4/2008 | Kinser et al. |
| 7,376,134 B2 | 5/2008 | Carter et al. |
| 7,386,514 B2 | 6/2008 | Major et al. |
| 7,389,225 B1 | 6/2008 | Jensen et al. |
| 7,426,516 B1 | 9/2008 | Ackerman et al. |
| 7,467,415 B2 | 12/2008 | Carter |
| 7,475,008 B2 | 1/2009 | Jensen et al. |
| 7,505,972 B1 | 3/2009 | Wootten et al. |
| 7,506,055 B2 | 3/2009 | McClain et al. |
| 7,552,468 B2 | 6/2009 | Burch et al. |
| 7,562,011 B2 | 7/2009 | Carter et al. |
| 8,566,932 B1 * | 10/2013 | Hotta et al. .................. 726/22 |
| 2008/0082601 A1 * | 4/2008 | Meijer et al. ................ 709/203 |
| 2010/0251329 A1 * | 9/2010 | Wei .................................. 726/1 |
| 2010/0269164 A1 * | 10/2010 | Sosnosky et al. ............... 726/7 |

* cited by examiner

SYSTEM AND METHOD FOR IMPLEMENTING CLOUD MITIGATION AND OPERATIONS CONTROLLERS

CROSS-REFERENCE TO RELATED APPLICATIONS

This application is related to the following commonly-assigned, co-pending applications, each of which is also incorporated herein by reference in its entirety:
1. U.S. patent application Ser. No. 12/612,807 filed on Nov. 5, 2009, now U.S. Pat. No. 8,065,395 issued on Nov. 22, 2011;
2. U.S. patent application Ser. No. 12/612,818 filed on Nov. 5, 2009;
3. U.S. patent application Ser. No. 12/612,834 filed on Nov. 5, 2009;
4. U.S. patent application Ser. No. 12/612,841 filed on Nov. 5, 2009;
5. U.S. patent application Ser. No. 12/612,882 filed on Nov. 5, 2009;
6. U.S. patent application Ser. No. 12/612,895 filed on Nov. 5, 2009;
7. U.S. patent application Ser. No. 12/612,925 filed on Nov. 5, 2009;
8. U.S. patent application Ser. No. 12/613,077 filed on Nov. 5, 2009;
9. U.S. patent application Ser. No. 12/613,098 filed on Nov. 5, 2009;
10. U.S. patent application Ser. No. 12/613,112 filed on Nov. 5, 2009; and
11. U.S. patent application Ser. No. 12/197,833 filed on Aug. 25, 2008, now U.S. Pat. No. 8,036,396 issued on Oct. 11, 2011.

BACKGROUND

Cloud computing is a type of computing in which dynamically scalable and typically virtualized resources are provided as services via the Internet. As a result, users need not, and typically do not, possess knowledge of, expertise in, or control over the technology and/or infrastructure implemented in the cloud. Cloud computing generally incorporates infrastructure as a service ("IaaS"), platform as a service ("PaaS"), and/or software as a service ("SaaS"). In a typical embodiment, cloud computing services provide common applications online, which applications are accessed using a web browser and the software and data for which are stored on servers comprising the cloud.

Cloud computing customers typically do not own or possess the physical infrastructure that hosts their software platform; rather, the infrastructure is leased in some manner from a third-party provider. Cloud computing customers can avoid capital expenditures by paying a provider for only what they use on a utility, or resources consumed, basis or a subscription, or time-based, basis, for example. Sharing computing power and/or storage capacity among multiple lessees has many advantages, including improved utilization rates and an increase in overall computer usage.

The Internet is rapidly spawning a host of "cloud providers" to provide infrastructure, platforms, and software as a service. Cloud providers such as Amazon.com (AWS), GoGrid, Eucalyptus, and others, are providing a host of new opportunities on the Internet, but have not worked together to provide a common identity, platform, or storage abstraction.

SUMMARY

One embodiment is a system for controlling operation of a cloud computing environment. The system comprises a repository for storing data regarding characteristics of the cloud computing environment, wherein the stored data includes policy notations designating compliance or non-compliance of the data with policy; an analyst module for analyzing the stored data in combination with external report information regarding the cloud computing environment and for providing results of the analysis; and a controller for evaluating the analysis results and issuing instructions for controlling operation of the cloud computing environment based on the evaluating.

DETAILED DESCRIPTION

To better illustrate the advantages and features of the embodiments, a particular description of several embodiments will be provided with reference to the attached drawings. These drawings, and other embodiments described herein, only illustrate selected aspects of the embodiments and are not intended to limit the scope thereof. Further, despite reference to specific features illustrated in the example embodiments, it will nevertheless be understood that these features are not essential to all embodiments and no limitation of the scope thereof is thereby intended. Any alterations and further modifications in the described embodiments, and any further applications of the principles of the embodiments as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components not otherwise illustrated.

The embodiments described herein provide a mechanism for training cloud providers, whether they be IaaS, PaaS, or SaaS, such that proper operations can be assured and instructions issued to modify the operational use of the could by an enterprise and the mitigation of problems and the generation of instructions to cause the mitigation to take place.

Figure 1:
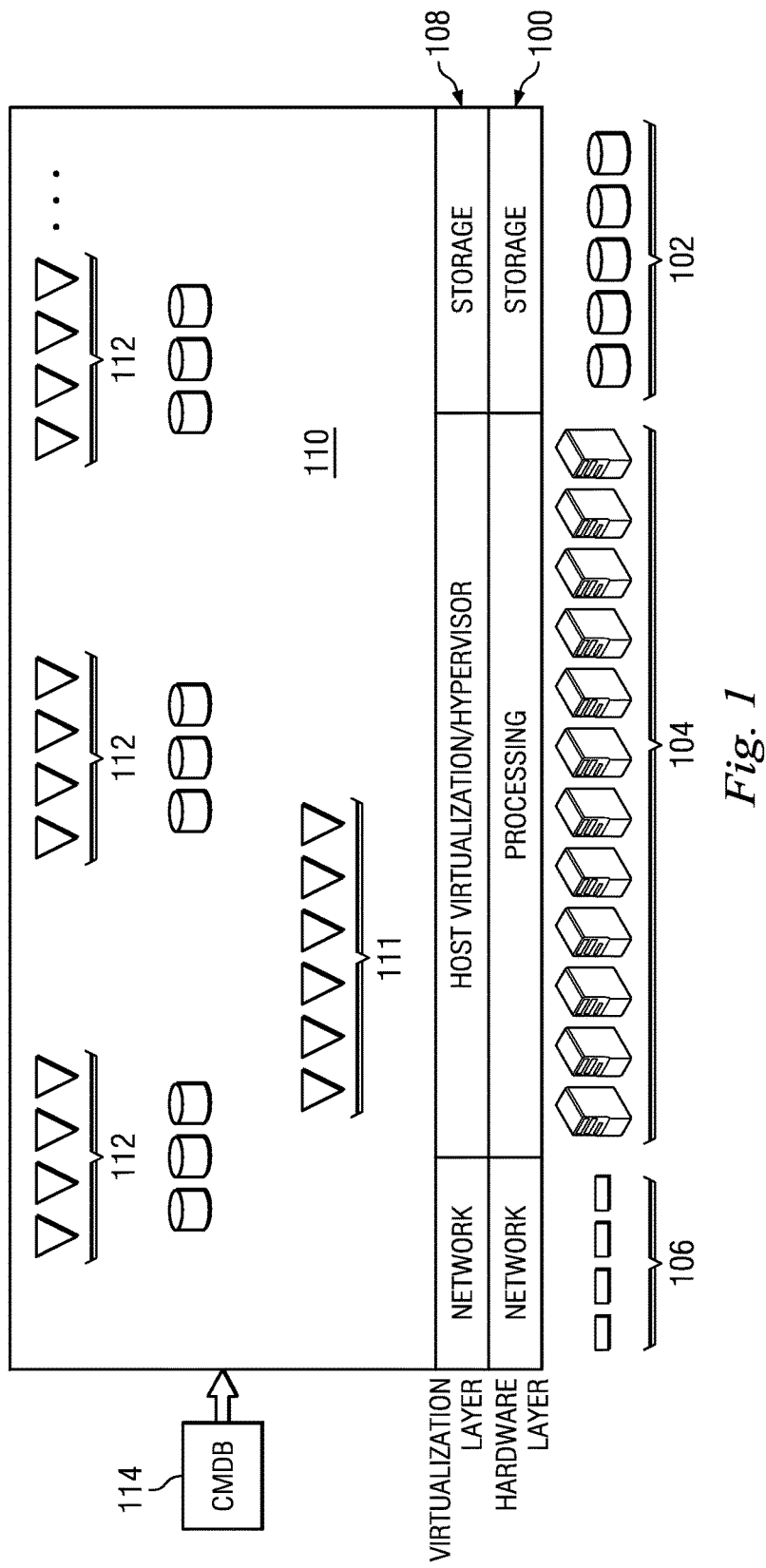
FIG. 1 illustrates an exemplary IaaS cloud structure such as may be implemented in one embodiment.

FIG. 1 illustrates an exemplary IaaS cloud structure. As shown in FIG. 1, the cloud structure includes a hardware layer 100 comprising storage assets 102, processing assets 104, and network assets 106. To facilitate usefulness of the cloud to a variety of enterprises, workloads are sponsored in the cloud as virtual machines possibly accessing virtualized storage and/or virtualized networks. This is accomplished via a virtualization layer 108. Thus, the hardware layer 100 is insulated from the actual workloads to be sponsored in the cloud at a layer 110 by the virtualization layer 108 hardware, storage, and networking so that the operating system selected by the enterprise can be sponsored on whatever hardware the cloud provider makes available. Having established the hardware and virtualization layers 100, 108, the assets 102, 104, and 106 are available in a standardized way to workloads hosted in the workload layer 110, which is the layer the customer typically views as the "cloud". It will be recognized that some of the workloads sponsored in the cloud, specifically, workloads 111, are workloads that are germane to the operation of the cloud and may consist of monitoring processes for enabling the cloud provider to monitor the health of the cloud, management processes to enable the cloud provider to ensure that service-level agreements are enforced, and so on.

Enterprises using the cloud are represented by virtualization processes and storage shown as workloads 112. These processes are typically started by an enterprise via a cloud portal or API utilized by administrative personnel or processes running at the enterprise or in the cloud. A typical cloud provider may be using standard ITIL practices and may utilize a configuration management database ("CMDB") 114, which affects the entire cloud infrastructure and which describes the practice and policies used for instantiating virtualized workloads and storage.

Figure 2:
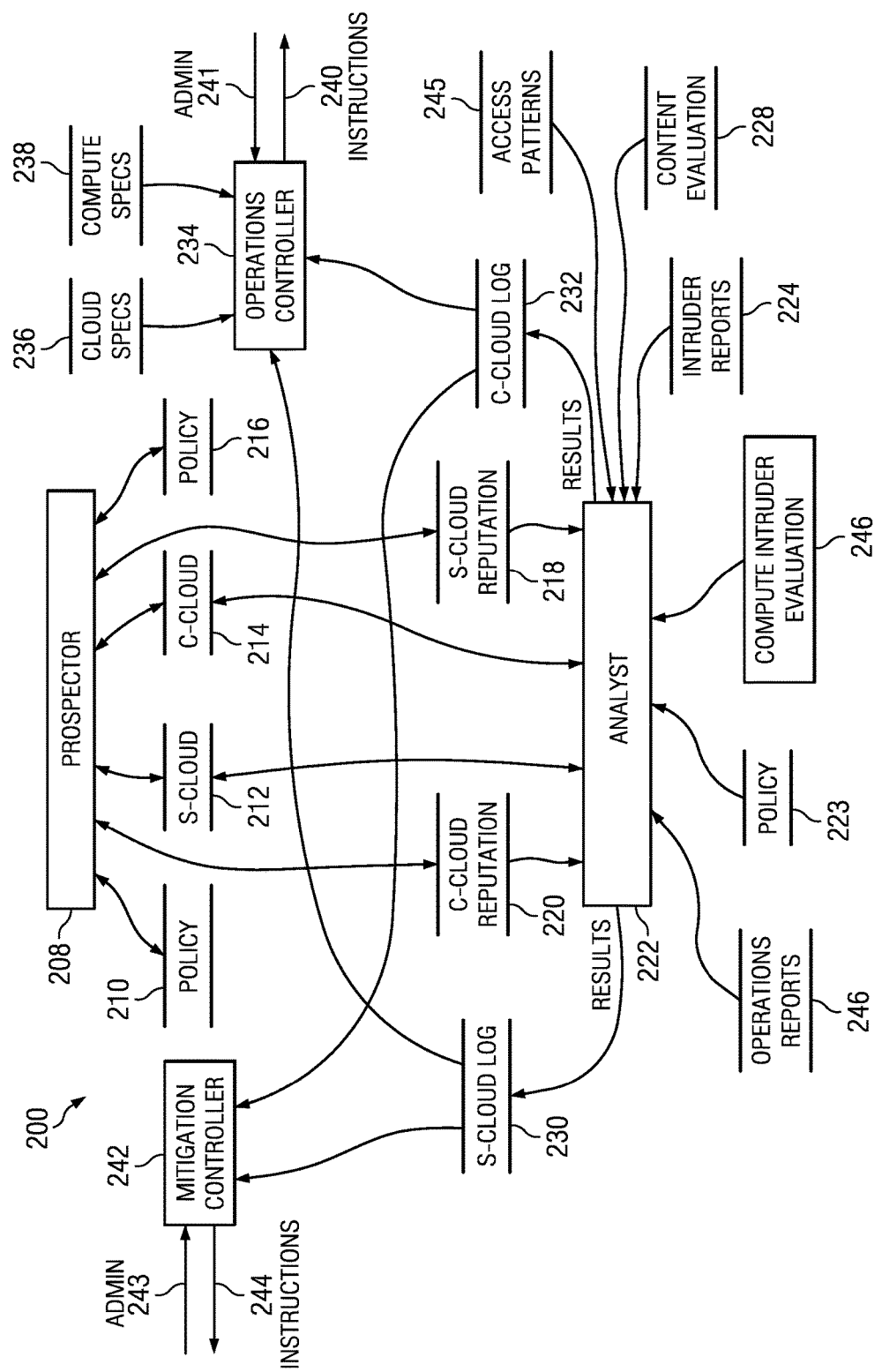
FIG. 2 is a flow diagram of one embodiment of a process for implementing cloud mitigation and operations controllers.

FIG. 2 is a flow diagram of one embodiment 200 of a system and process for implementing cloud mitigation and operations controllers. One embodiment provides methods and mechanisms for enabling an enterprise (e.g., via an administrative function) to perform monitoring, operational management, and mitigation management of workloads in various cloud infrastructures (e.g., via controller instructions issued thereto). One embodiment also provides for the generation of instructions for modifying an operation to result in operational characteristics that either align more closely with policy dictates or mitigate problems that are being observed.

U.S. patent application Ser. No. 12/197,833, previously incorporated herein by reference, describes a "prospector" that implements methods and mechanisms for prospecting the Internet for cloud computing environments and qualifying such environments and providers thereof based on observations, published statistics, cost matrices, and the measurement of operational characteristics within the cloud by agents. One embodiment described herein utilizes data output from the prospector, which is designated in FIG. 2 by a reference numeral 208, and adds significantly thereto to enable an enterprise to utilize cloud resources such that operational characteristics are enforced in accordance with policy and mitigation actions are taken in situations in which policy cannot be enforced appropriately.

The embodiment described herein recharacterizes the data output from the prospector 208 such that it accesses policy 210, which may include but is not limited to usage policies, failover policies, and redundancy policies. The policy 210 may also include storage locality policies, which may further comprise policies to separate data locality so that a natural disaster in one part of the country would not affect the backup for redundancy storage in another part of the country. The embodiment illustrated in FIG. 2 also recharacterizes the output of the prospector 208 as operational characteristics of S-cloud (storage), stored in an S-cloud repository 212, operational characteristics of C-cloud (compute or process), stored in a C-cloud repository 214, and operational policy 216 that is specific to the prospector 208. It should be noted that the policy 210 is applied to processes and storage in the cloud while the operational policy 216 guides the actions of the prospector. In one embodiment, reputation is also recharacterized so that the reputation of operation for the S-cloud, as designated in FIG. 2 by a reference numeral 218, is separate from the reputation of operation for the C-cloud, as designated in FIG. 2 by a reference numeral 220.

All of the observation of the prospector 208 as previously disclosed are contained within the S-cloud repository 212, C-cloud repository 214, S-cloud reputation repository 218 and C-cloud reputation repository 220. The content of each of these repositories 212-220 includes policy notations designating their compliance or non-compliance with policy statements concerning usage, failover, and redundancy (i.e., the policy 210), as relates to both compute operations (C-cloud) and storage operations (S-cloud). An analyst module 222 accesses the repositories 212-220 and, according to a policy 223 comprising, for example, risk specifications such as GRC, that guide the analysis, combines the accessed information with other information. Such other information may include information from external sources, such as intruder reports 224, which may indicate new intrusions, new viruses, new cloud attacks, and/or new penetrations noted by external analysis organizations, and operations reports 226, which may include cost matrices of the utilization of cloud assets both in terms of compute, storage, and bandwidth, safety reports in which the safety of certain geographic areas (such as earthquakes or projected storms) can be stipulated, and complaints against various cloud providers.

Also input to the analyst module 222 is content that is being placed in the cloud via a content evaluation module 228, which ensures that content tagged by policy not to leave the data center is not placed in the cloud and vice versa. Although not shown in FIG. 2, it will be recognized that semantic processing can also be performed to evaluate what kind of information is reaching the cloud and whether or not any correlations should be drawn by others who are accessing that content. In one embodiment, results of the analysis performed by the analyst module 222 are output back into the S-cloud and C-cloud repositories 212, 214 maintained by the prospector 208. In another embodiment, such as is illustrated in FIG. 2, results of the analysis performed by the analyst module 222 are also stored in additional S-cloud and C-cloud repositories 230, 232, respectively.

Using the results of the analysis performed by the analyst module 222, an operations controller 234 can analyze policy and cloud specifications 236 and compute specifications 238 to determine whether desired operational characteristics of the cloud are being realized both for storage and compute, as well as bandwidth. If adjustments need to be made in the operational environment being used by the enterprise in the cloud, instructions 240 can be produced by the operations controller 234 that either automatically modify the job spawning and distribution processes for the cloud or alert the operations center of the need to do so manually. An administrator can also provide administrative instructions 241 to the operations controller 234 for modifying the operation thereof as necessary or desired.

Similarly, such S-cloud and C-cloud information from the repositories 230, 232, can be evaluated by a mitigation controller 242 such that, according to policy, undesirable events for operational characteristics can be discovered and instructions 244 can be issued by the mitigation controller 242 to modify the operational use of cloud assets such that problems with regulatory compliance or other policy can be mitigated. These instructions 244 may be used automatically, e.g., via issuance to the operations controller 234, or may be inserted into a ticketing system so that the operations center personnel can take care of the issue manually. As with the operations controller 234, an administrator can provide administrative instructions 243 to the mitigation controller 242 for modifying the operation thereof as necessary or desired.

Some of the results of the instructions 244 from the mitigation controller 242 may result in the movement of storage from one geographic area to another; the movement of storage from the cloud back to a data center of an enterprise; and the movement of processes from one cloud IaaS provider to another in order to achieve higher operational satisfaction and the like. In another example, a particular cloud provider may be under attack and various penetrations noted by either the cloud provider or an external watchdog organization, which makes the usage of that particular cloud IaaS undesirable. In this case, both storage and processing would be moved from one cloud IaaS provider to another.

In one embodiment the intruder reports 224 may also be generated within the software subsystems in the cloud via well-known technology. Additionally, intrusion may be discovered by evaluating expected access patterns against actual access patterns 245 to determine whether the two match, as well as by evaluating external access requests, such as those that would be expected by a denial of service attack or some other attack via communications channel. Such an evaluation process is represented in FIG. 2 as a compute intruder evaluation module 246. It should be noted that other information may be accessed by the analyst module 222, such as cloud vendor advisories concerning cloudburst events or publication of some other operational event that would have undesirable effects.

It will be recognized that, although both the operations controller 234 and mitigation controller 242 are represented in one embodiment, embodiments may be provided in which only one such controller is present and/or in which multiple ones of either or both such controllers are present.

It will be recognized that various ones of the elements, modules, and/or modules described herein may be implemented using one or more general purpose computers or portions thereof executing software applications designed to perform the functions described or using one or more special purpose computers or portions thereof configured to perform the functions described. The software applications may comprise computer-executable instructions stored on computer-readable media. Additionally, repositories described herein may be implemented using databases or other appropriate storage media.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A system for controlling operation of a cloud computing environment comprising a storage cloud (S-cloud) and a computing cloud (C-cloud), the system comprising:

a repository for storing data regarding characteristics of the cloud computing environment, wherein the stored data includes policy notations designating compliance or noncompliance of the stored data with policy, wherein the stored data is generated in accordance with a prospector policy and comprises S-cloud operational characteristics data, C-cloud operational characteristics data, S-cloud reputation data, and C-cloud reputation data, wherein S-cloud reputation data comprises at least one of (i) S-cloud usage data, (ii) S-cloud failover data and (iii) S-cloud redundancy data, and wherein C-cloud reputation data comprises at least one of (i) C-cloud usage data, (ii) C-cloud failover data and (iii) C-cloud redundancy data;

an analyst module for analyzing the stored data according to risk specifications in combination with external report information regarding the cloud computing environment and for providing results of the analysis to a controller comprising a processor, wherein the controller evaluates the provided analysis results and issues instructions for controlling operation of the cloud computing environment based on the evaluating, wherein the controller comprises an operations controller, the operations controller evaluating policy, cloud specifications and compute specifications along with the analysis results to determine whether desired operational characteristics of the cloud computing environment are being realized, wherein the issued instructions comprise instructions for modifying job spawning and distribution processes of the cloud computing environment as indicated by the evaluating.

2. The system of claim 1 wherein the external report information comprises at least one of intrusion, virus, attack, penetration, safety, cost, and complaint information.

3. The system of claim 1 further comprising a prospector for generating the data stored in the cloud repository in accordance with a prospector policy.

4. The system of claim 1 wherein the cloud repository stores at least one of S-cloud operational characteristics, C-cloud operational characteristics, S-cloud reputation, and C-cloud reputation.

5. The system of claim 1 wherein the policy comprises at least one of failover policy, usage policy, redundancy policy, and locality policy.

6. The system of claim 1 wherein the controller comprises an operations controller, the operations controller evaluating policy and cloud specifications and compute specifications along with the analysis results to determine whether desired operational characteristics of the cloud computing environment are being realized, wherein the issued instructions comprise instructions for modifying job spawning and distribution processes of the cloud computing environment as indicated by the evaluating.

7. The system of claim 1 wherein the controller comprises a mitigation controller, the mitigation controller evaluating the analysis results to discover undesirable operational characteristics of the cloud computing environment, wherein the issued instructions comprise instructions for modifying operational use of resources of the cloud computing environment to mitigate the discovered undesirable operational characteristics.

8. The system of claim 7 further comprising an operations controller, the operations controller configured to evaluate the instructions issued by the mitigation controller, policy and cloud specifications, compute specifications, and the analysis results to determine whether desired operational characteristics of the cloud computing environment are being realized and for issuing instructions for modifying job spawning and distribution processes of the cloud computing environment as indicated by the operations controller evaluating.

9. The system of claim 1 wherein the controller is configured to receive administrative instructions for controlling operation of the controller.

10. A system for controlling operation of a cloud computing environment comprising a storage cloud (S-cloud) and a computing cloud (C-cloud), the system comprising:
- a repository for storing data generated in accordance with a prospector policy regarding characteristics of the cloud computing environment, wherein the stored data includes policy notations designating compliance or noncompliance of the stored data with policy, and wherein the stored data is generated in accordance with a prospector policy and comprises S-cloud operational characteristics data, C-cloud operational characteristics data, S-cloud reputation data, and C-cloud reputation data;
- an analyst for analyzing the stored data in combination with external report information regarding the cloud computing environment and for providing results of the analysis to a controller comprising a processor, wherein the controller evaluates the provided analysis results and issues instructions for controlling operation of the cloud computing environment based on the evaluating.

11. The system of claim 10 wherein the external report information comprises at least one of intrusion, virus, attack, penetration, safety, cost, and complaint information.

12. The system of claim 10 further comprising a prospector for generating the data stored in the repository in accordance with a prospector policy and wherein the repository stores at least one of S-cloud operational characteristics, C-cloud operational characteristics, S-cloud reputation, and C-cloud reputation.

13. The system of claim 10 wherein the policy comprises at least one of failover policy, usage policy, redundancy policy, and locality policy.

14. The system of claim 10 wherein the controller comprises an operations controller, the operations controller evaluating policy and cloud specifications and compute specifications along with the analysis results to determine whether desired operational characteristics of the cloud computing environment are being realized, wherein the issued instructions comprise instructions for modifying job spawning and distribution processes of the cloud computing environment as indicated by the evaluating.

15. The system of claim 10 wherein the controller comprises a mitigation controller, the mitigation controller evaluating the analysis results to discover undesirable operational characteristics of the cloud computing environment, wherein the issued instructions comprise instructions for modifying operational use of resources of the cloud computing environment to mitigate the discovered undesirable operational characteristics.

16. The system of claim 15 further comprising an operations controller, the operations controller configured to evaluate the instructions issued by the mitigation controller, policy and cloud specifications, compute specifications, and the analysis results to determine whether desired operational characteristics of the cloud computing environment are being realized and for issuing instructions for modifying job spawning and distribution processes of the cloud computing environment as indicated by the operations controller evaluating.

17. The system of claim 10 wherein the controller is configured to receive administrative instructions for controlling operation thereof.

18. A method of controlling operation of a cloud computing environment, the method comprising:
- storing data regarding characteristics of the cloud computing environment in a repository, the stored data including policy notations designating compliance or noncompliance of the data with policy, wherein the stored data is generated in accordance with a prospector policy and comprises S-cloud operational characteristics data, C-cloud operational characteristics data, S-cloud reputation data, and C-cloud reputation data;
- analyzing the stored data in combination with external report information regarding the cloud computing environment and for providing results of the analysis; and
- evaluating the analysis results and issuing instructions for controlling operation of the cloud computing environment based on the evaluating.

19. The method of claim 18 wherein the evaluating comprises evaluating policy and cloud specifications and compute specifications along with analysis results to determine whether desired operational characteristics of the cloud computing environment are being realized, wherein the issued instructions comprise instructions for modifying job spawning and distribution processes of the cloud computing environment as indicated by the evaluating.

20. The method of claim 18 wherein the evaluating comprises evaluating analysis results to discover undesirable operational characteristics of the cloud computing environment, wherein the issued instructions comprise instructions for modifying operational use of resources of the cloud computing environment to mitigate the discovered undesirable operational characteristics.

* * * * *